United States Patent
Carter (10) Patent No.: US 11,613,200 B2
(45) Date of Patent: Mar. 28, 2023

(54) TENSIONING SYSTEM

(71) Applicant: NIGEL CARTER TECHNICAL SERVICES LIMITED, West Yorkshire (GB)

(72) Inventor: Nigel Carter, West Yorkshire (GB)

(73) Assignee: NIGEL CARTER TECHNICAL SERVICES LIMITED, West Yorkshire (GB)

( * ) Notice: Subject to any disclaimer, the term of this patent is extended or adjusted under 35 U.S.C. 154(b) by 388 days.

(21) Appl. No.: 16/764,709

(22) PCT Filed: Oct. 23, 2018

(86) PCT No.: PCT/GB2018/053050
§ 371 (c)(1),
(2) Date: May 15, 2020

(87) PCT Pub. No.: WO2019/097202
PCT Pub. Date: May 23, 2019

(65) Prior Publication Data
US 2021/0061160 A1 Mar. 4, 2021

(30) Foreign Application Priority Data
Nov. 20, 2017 (GB) ..................................... 1719223

(51) Int. Cl.
*B60P 7/08* (2006.01)
*B66D 1/34* (2006.01)
(Continued)

(52) U.S. Cl.
CPC ........... *B60P 7/0846* (2013.01); *B60P 7/0838* (2013.01); *B66D 1/34* (2013.01); *B66D 1/36* (2013.01); *B60P 7/0869* (2013.01); *B62D 33/04* (2013.01)

(58) Field of Classification Search
CPC .......... B60R 7/0846; B66D 1/34; B66D 1/36; Y10T 24/2175
See application file for complete search history.

(56) References Cited

U.S. PATENT DOCUMENTS

| 559,133 A | 4/1896 | Holden | |
| 2,991,975 A * | 7/1961 | Alexander | B66D 1/04 410/103 |

(Continued)

FOREIGN PATENT DOCUMENTS

| CN | 201046897 Y | 4/2008 |
| CN | 204751735 U | 11/2015 |

(Continued)

OTHER PUBLICATIONS

PCT International Search Report and Written Opinion for International Application No. PCT/GB2018/053050, dated Jan. 25, 2019, 11 pages.

(Continued)

*Primary Examiner* — Robert Sandy
(74) *Attorney, Agent, or Firm* — Hoffman Warnick LLC (57) ABSTRACT

An improved tensioning system and method of restraining cargo is provided. The tensioning system is easy and quick to operate. The tensioning system is compact and minimises space within a cargo bay. The tensioning system allows a greater angular displacement of a tensioning line over conventional tensioning system, such as a ratchet and strap mechanism.

15 Claims, 7 Drawing Sheets

(51) Int. Cl.
*B66D 1/36* (2006.01)
*B62D 33/04* (2006.01)

(56) References Cited

U.S. PATENT DOCUMENTS

| | | | |
|---|---|---|---|
| 3,428,331 A | 2/1969 | Morgan et al. | |
| 3,848,889 A * | 11/1974 | Sharrow | B60P 7/083 |
| | | | 410/103 |
| 4,568,036 A | 2/1986 | Kearney | |
| 4,575,050 A | 3/1986 | Bechmann | |
| 5,156,506 A * | 10/1992 | Bailey | B60P 3/41 |
| | | | 410/100 |
| 6,481,692 B1 | 11/2002 | King | |
| 7,090,450 B1 * | 8/2006 | Carter | B61D 45/001 |
| | | | 410/103 |
| 10,017,353 B1 | 7/2018 | Zhang | |
| 2008/0257999 A1 | 10/2008 | Wingate et al. | |
| 2009/0236576 A1 | 9/2009 | Chou | |

FOREIGN PATENT DOCUMENTS

| | | |
|---|---|---|
| CN | 205573732 U | 9/2016 |
| CN | 106081750 A | 11/2016 |
| CN | 206691367 U | 12/2017 |
| FR | 1177481 A | 4/1959 |
| WO | 0206147 A1 | 1/2002 |

OTHER PUBLICATIONS

Great Britain combined Search and Examination Report for Application No. GB1719223.8, dated May 18, 2018, 5 pages.
Great Britain Examination Report for Application No. GB1719223.8, dated Dec. 20, 2018, 2 pages.

* cited by examiner

TENSIONING SYSTEM

FIELD

The present disclosure relates in general to a tensioning system and a method of restraining a cargo. The system is particularly suited for use in load restraint and more particularly suited to application in flatbed and/or curtain-sided vehicles.

BACKGROUND

Conventionally, load securing systems are required when transporting goods in road haulage vehicles. This is to ensure the safe and effective transport of goods. Given the human, environmental and economic consequences of poor load securement such systems are paramount to the reputation of the road haulage industry. Unsecured loads can cause road traffic collisions, spillage and/or road closures. However, load securing methods must also be convenient, space efficient and quick to deploy, otherwise operators may be less inclined to use them. Incidents occur when the amount of load restraint to keep a load on the vehicle is underestimated. To help combat this issue, many regulators exist across the UK and Europe. The aim of these regulators is to safeguard the interest of the public and the local economies to help guide operators and drivers on how to secure loads effectively.

There are different types of road haulage vehicle. One example is a curtain-sided vehicle (commonly referred to as a curtainsider). A curtain-sided vehicle comprises curtains on runners positioned at the side of a trailer that can be pulled back and forth to access the storage area of the trailer. Once the goods are loaded in the storage area (and secured for travel), the curtains are closed and retaining straps are tightened between the runners to tauten the curtains.

Recently, the Driver and Vehicle Standards Agency (DVSA), a UK government organisation, published new guidance on securing loads in vehicles on 18 Jul. 2017. As stated in Section 6.1 of the recent DVSA guidance, the curtains of curtain-sided vehicles are unable to sufficiently secure a cargo. The main job of the curtains is to provide a weatherproof cover for the cargo. Simply using stronger curtains has limited benefits. A curtain-sided vehicle should therefore be viewed as a flatbed vehicle, which does not comprise a curtain.

There are many ways of securing loads in curtain-sided vehicles. One approach is to use webbing or buckle straps that may hang from the roof of the body structure. These straps are typically pulled taut by ratchets to provide a static load onto the goods and through the bed of the trailer, which transfers load directly to the chassis. Therefore, any dynamic loads imparted on the goods are transferred to the straps and directly to the structure of the vehicle. For more heavy loads, lashing, nets or tarpaulin with integral straps may be used.

Figure 1:
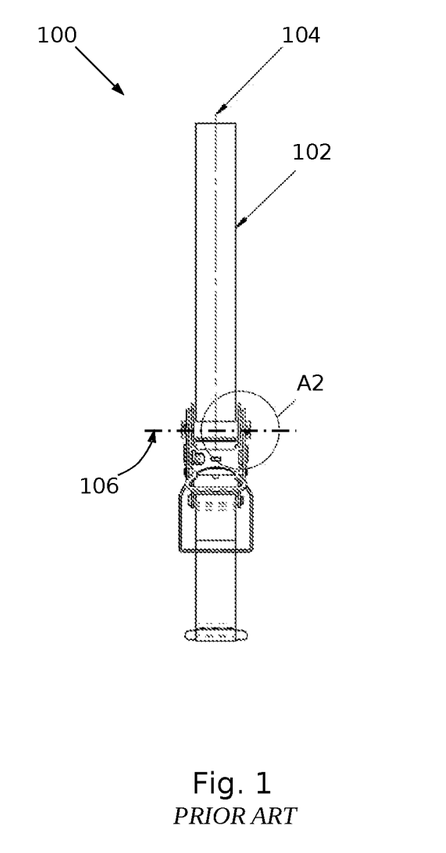
FIG. 1 shows a front view of a known device including a ratchet and strap.
Figure 2:
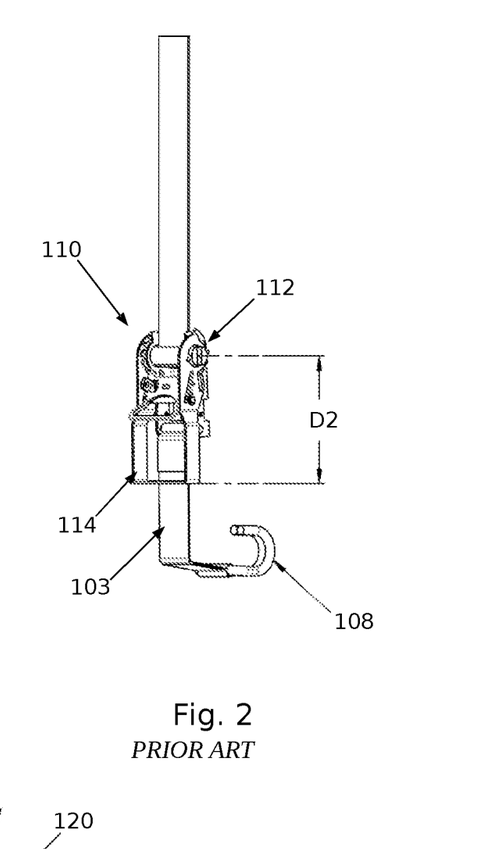
FIG. 2 shows a perspective view of the known device of FIG. 1.
Figure 3:
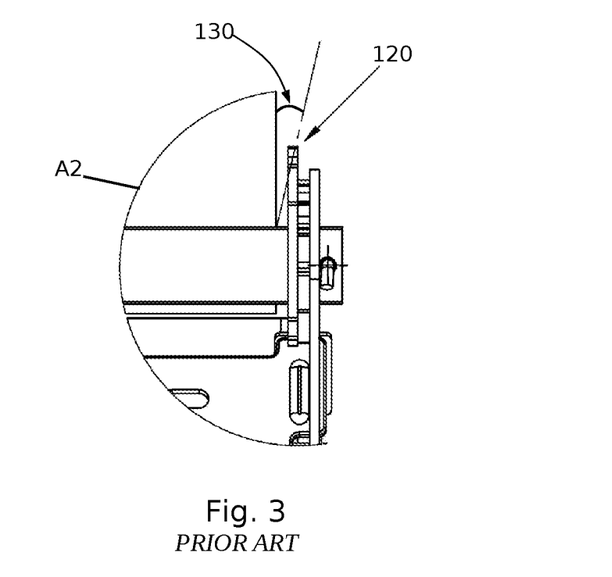
FIG. 3 shows an enlarged view of area A2 of FIG. 1.

An example of a typical ratchet and strap mechanism 100 is shown in FIGS. 1-3. The strap (also known as webbing) comprises a main strap 102 and an anchor strap 103. The main strap 102 is configured to contact cargo and be drawn towards a body of the ratchet 110 when a handle 114 of the ratchet 110 is turned. The effective length of the main strap 102 therefore decreases as tension is applied. In contrast, the anchor strap 103, which interlinks the body of the ratchet 110 and an anchor 108 (shown as a hook) to be coupled to a cargo bay, has a relatively fixed effective length. The handle 114 of the ratchet 110 arranged in a radial direction rotates about a winding axis 106 to rotate a slotted drum 112. The main strap 102 threaded through the slot in the slotted drum 112 is wound around the slotted drum 112 and is gripped by the slotted drum 112 once the slotted drum 112 is rotated. The ratchet 110 comprises a pawl and ratchet mechanism to hold the slotted drum 112 at discrete intervals in order to maintain one-directional control of the slotted drum 112 unless a release mechanism is activated. The torque that can be generated is proportional to an input force (effort inputted by an operator) and a distance D2. Therefore, high torques can only easily be generated by increasing the distance in a direction radial to the winding axis 106.

In order for the ratchet and strap mechanism 100 to work, the main strap 102, the winding axis 106 and the anchor strap 103 must be maintained substantially on a plane 104 radial to the winding axis 106. Any deviations from said radial plane 104 resulting in an angle 130 between the radial plane 104 and the longitudinal axis of the main strap 102 mean that the main strap 102 interferes with a hub 120 of the ratchet mechanism (see enlarged view of A2 in FIG. 3) and the main strap 102 cannot lie flat around itself. Consequently, the main strap 102 may fold over itself causing a jam. This premature locking of the ratchet and strap mechanism 100 (i.e. jamming) and/or rapid wear of the main strap 102 leads to poor performance and/or the replacement of parts. Although the anchor 108 is typically able to move along a rail of the cargo bay, such movement is minimal. Therefore, the conventional ratchet and strap mechanism 100 relies on the longitudinal axes of the main strap 102 and anchor strap 103 being coaxial to each other and radial to the winding axis 106 at all times.

The approach taught by the ratchet and strap mechanism 100 is time consuming for an operator which instils a reluctance to use them. Furthermore, the required load is typically determined by the user themselves in a manual way (i.e. manual feedback). Thus, there is a need to provide a tensioning system that is quick to deploy (to minimise transportation downtime), space efficient (so more goods can be transported), easy to use (to encourage the use of the system in day-to-day operation) and/or less open to user interpretation/judgement (to reduce user error, achieve the required securement loads and avoid repetitive strain injury).

It is therefore an aim to provide a tensioning system that is convenient, space-efficient and/or user friendly. The tensioning system of the example embodiments offers an alternative to previously available approaches. The example embodiments have been provided with a view to addressing at least some of the difficulties that are encountered with current tensioning systems and methods, whether those difficulties have been specifically mentioned above or will otherwise be appreciated from the discussion herein.

SUMMARY

It is an object of the present invention to overcome at least one of the above or other disadvantages. It is an aim of the present invention to provide a tensioning system as set out in the claims. It is a further aim to provide a method of restraining cargo as set out in the claims.

A tensioning system is provided. The tensioning system includes a spool rotatable about a winding axis, a torque generator and a brake. The spool is a rotating member for engagement with a line (i.e. a tensioning line) to be tensioned. The torque generator is suitable for transmitting torque to the spool. That is, the torque generator is a means by which torque can be imparted to the spool in order to cause the spool to continuously rotate about the winding axis. The brake is suitable for imparting rotational resistance to the spool. That is, the brake is a means by which rotation of the spool is resisted in at least one rotational direction of the spool.

The spool comprises a first hub, a second hub and a pair of connecting members. Each one of the pair of connecting members interconnects the first hub and the second hub and is configured to transmit torque between the first hub and the second hub. That is, a torque produced by the torque generator is transferred to the first hub, pair of connecting members and second hub in that order. The term hub is used to define a member for resisting displacement of a tensioning line along a winding axis.

Each of the pair of connecting members is spaced apart from the other to form a gap there between. The gap is suitable for receiving a tensioning line to be tensioned by the spool. The gap is delimited by surfaces of the first hub, the second hub and the pair of connecting members. That is, a boundary of the gap comprises a surface of the first hub, a surface of the second hub and a surface of each of the pair of connecting members.

The spool comprises a winding space for receiving said tensioning line as said tensioning line is wound around the pair of connecting members. The winding space exists between the first hub, the second hub and the pair of connecting members. The winding space is unobstructed in a radial direction of the winding axis but is limited by a surface of the first hub and a surface of the second hub in an axial direction. A length of the winding space in a direction of the winding axis is greater than a length of the gap in the direction of the winding axis.

Advantageously, angular displacement of said tensioning line about a plane radial to the winding axis is possible and is not limited by the gap. Movement of the tensioning line about the plane radial to the winding axis is possible without prior resistance from either the first hub or second hub. Beneficially, wear of said tensioning line is reduced which helps to increase longevity of use.

The torque generator may be arranged on a driving side and the brake may be arranged on a braking side. The terms braking side and driving side may each refer to axial positions along the winding axis. The driving side may be coaxial to the braking side. The braking side may be limited to a different side to the driving side. Therefore, there may be a single driving side and a single braking side. The torque generator may act only on one side of the spool along the winding axis. The brake may act only on one axial side of the spool along the winding axis.

The gap may be located midway along the length of the winding space. That is, a centre of the gap may be located at a point along the length of the winding space in the winding axis direction that is half the length of the winding space. When looking constantly at a reference plane of the winding axis, the gap may change shape as the spool rotates. The gap may have a maximum shape at a predetermined rotational position. The predetermined rotational position may be the rotational position at which the winding axis and axes of the pair of connecting members are on the reference plane. Additionally or alternatively, the gap may be symmetric about a plane perpendicular to the winding axis when viewing the reference plane. The gap may be a regular polygon when viewing the reference plane. The gap may comprise an arcuate portion when viewing the reference plane. The gap may be a circle when viewing the reference plane. The gap may be square when viewing the reference plane. That is, the gap may have a substantially square cross-sectional area when viewing the reference plane. Beneficially, these instances provide improved control of a location of said tensioning line when said tensioning line exists within the gap. The winding axis may pass through the gap and may pass through a centre of the gap.

The winding space may comprise a first length and a second length, wherein the first length is closer in distance to the winding axis and smaller in value than the second length. That is, the winding space has an increased length in a radial direction from the winding axis. Advantageously, the winding space allows an angular displacement of said tensioning line without impacting the first hub and/or second hub.

A winding surface of the first hub and a winding surface of the second hub may be inclined with respect to the winding axis at an angle of inclination. Each winding surface is a surface for contact with said tensioning line when the tensioning line is wound onto the spool.

The angle of inclination is an angle measured through the respective hub from the winding surface towards the winding axis. The angle of inclination may be less than 90 degrees. Preferably, the angle of inclination is between 30 and 60 degrees. More preferably, the angle of inclination is between 40 and 50 degrees. Most preferably, the angle of inclination is 45 degrees. Alternatively, or additionally, part or all of the winding surface of the first hub and/or part or all of the winding surface of the second hub may be arcuate and the angle of inclination may be an average of the arcuate surface from one end to another.

The first hub and/or the second hub may be conical, for example frustoconical. Each of the pair of connecting members may be partially or entirely coupled to a sloped surface of the frustoconical first hub and/or partially or entirely coupled to a sloped surface of the frustoconical second hub. The radial extent of the frustoconical first hub and/or frustoconical second hub may define a radial limit of the torque generator and/or brake.

An angle within each plane radial to the winding axis between a winding surface of the frustoconical first hub and a winding surface of the frustoconical second hub may be between 50 degrees and 130 degrees. Preferably, the angle is between 70 and 110 degrees. More preferably, the angle is between 80 and 100 degrees. Even more preferably, the angle is between 85 and 95 degrees. Most preferably, the angle is 90 degrees.

A width of the gap may be greater than a width of each connecting member when measured in the same direction. That is, a width of the gap measured in the radial direction of the winding axis may be greater than a width of each connecting member also measured in the radial direction of the winding axis. The width of the gap may be between a factor of 0.1 and 1 greater than a width of at least one connecting member. Preferably, the factor is between 0.3 and 0.8. More preferably, the factor is between 0.4 and 0.6. Most preferably, the factor is between 0.45 and 0.55.

Each of the pair of connecting members may have a cross-sectional shape that is rotationally symmetric when viewed in the direction of the winding axis. The cross-sectional shape may be cylindrical. That is, the pair of connecting members may be round pins.

The pair of connecting members may be arranged entirely away from the winding axis. The pair of connecting members may be indirectly connected to each other in that the pair of connecting members may be only connected via the first hub and second hub.

A longitudinal axis of each of the pair of connecting members may be parallel to the winding axis. Each longitudinal axis may exist on the same plane as the winding axis.

Each of the pair of connecting members may therefore be considered an off-centre axle.

The torque generator may be embodied as a hydraulic motor. The tensioning system may comprise a speed controller for controlling the torque generator. That is, an output speed of the torque generator may decrease from a first winding speed to a second winding speed that is lower than the first winding speed when a tensioning line is wound around the pair of connecting members.

The brake may be arranged to prevent rotation of the second hub in a rotational direction that is opposite to a driving rotational direction. The brake may be biased to a rotation prevention state. That is, the default state (resting state) of the brake may be set to prevent back rotation of the spool in the direction opposite the driving rotational direction.

The brake may be embodied as a one-way clutch. A one-way clutch may comprise an inner race and an outer race separated by a plurality of blocking members. The plurality of blocking members may lock the inner race and outer race together when arranged in a blocking state such that the inner race and outer race rotate together. When one of the inner race and outer race is static, the plurality of blocking members halt rotation of the other race when arranged in the blocking state.

The brake may comprise braking positions with non-discrete intervals. That is, an infinite number of braking positions may exist between two extremes, i.e. an upper and lower limit. The braking positions may therefore be continuous and offer precise control.

The tensioning system may comprise a controller for varying torque transfer between the torque generator and said tensioning line to be tensioned. The controller may comprise a pressure relief valve. The pressure relief valve may have a predetermined relief pressure for limiting the tension of the tensioning line.

The spool may comprise a first axle and a second axle each coaxial with the winding axis. The first axle may be coupled to the torque generator and the second axle may be coupled to the brake. Alternatively, or additionally, the torque generator may comprise a driving side axle for engaging with the spool and the brake may comprise a braking side axle for engaging with the spool.

The torque generator may comprise a first housing. The brake may comprise a second housing. Either or both of the first housing and second housing may exist entirely within a maximum radial extent of either or both of the first hub and second hub. This allows the tensioning system to be compact. Each of the first housing and second housing may comprise a flange for mounting the respective housing on an external body, such as a housing of a transportation system. A thickness of the flange on the second housing in the winding axis direction may be greater than a corresponding thickness of the flange on the first housing.

The tensioning system may comprise a tensioning line. The tensioning line may be a rope or a cable. That is, the tensioning line may be a tendon comprising a plurality of coils. A cross-sectional area of the gap may be between a factor of 0.5 and 2 greater than a cross-sectional area of the tensioning line.

The torque generator and the brake may be coaxially arranged. That is, a rotational axis of the torque generator and a rotational axis of the brake are aligned. That is, the torque generator and the brake are arranged on the winding axis. Advantageously, a compact arrangement is provided.

The torque generator may be only directly communicable with the first hub. The brake may be only directly communicable with the second hub.

A transportation system is further provided. The transportation system comprises a transportation body moveable by a propulsion means and having a cargo bay for carrying a cargo. The cargo may, for example, include a plurality of containers. The propulsion means may, for example, be an electric motor, an internal combustion engine or an external combustion engine. The propulsion means may be powered by liquid fuel. The transportation system further comprises the tensioning system as previously described and a housing for coupling the tensioning system to the cargo bay.

The transportation system may comprise a curtain positioned at a side of the transportation body. The curtain may be suitable for protecting the cargo from interaction with weather conditions, such as rain. The tensioning system and housing may be concealable by the curtain.

The transportation system may comprise a tensioning line for being tensioned by the tensioning system. The tensioning line may be a continuous line. The tensioning line may comprise a first portion and a second portion, wherein the second portion is more elastic than the first portion. The first portion and second portion may be longitudinal portions which are arranged longitudinally side-by-side.

The tensioning line may be embodied as rope. The first portion of the tensioning line may be embodied as rope and the second portion may be embodied as bungee cord. The second portion may be arranged to put the tensioning line in a state of tension before use. That is, the second portion is for pretensioning the first portion on a cargo bay and/or a cargo.

Each end of the same tensioning line may be fixed to the transportation body by a respective fixing such that movement of the tensioning line through the gap is prevented by each fixing. The tensioning line may be held freely in the gap whilst providing pretension to the cargo by the fixing at each end of the tensioning line.

The transportation system may comprise a freely rotatable pulley wheel for guiding the tensioning line away from the spool. The freely rotatable pulley wheel may be concealed from view at least partially by the tensioning system when the freely rotatable pulley wheel is arranged in the housing. The freely rotatable pulley wheel may be contactable with the second portion of the tensioning line. The axis of the freely rotatable pulley wheel may extend in a direction perpendicular to the winding axis.

The transportation system may comprise a net in communication with the tensioning line for conforming to the shape of said cargo and for distributing a clamping force imparted on said cargo. The net may be biased away from the cargo bay. That is, the net may have a starting position which is away from the cargo bay.

The housing may comprise a fluid gallery. The fluid gallery may be communicable at least one or both of the brake and torque generator. The fluid gallery may be suitable for containing air, water or oil for example. The fluid is a force transfer medium.

In a single tensioning cycle, the brake is deployed a single time at the required tension to restrain a cargo. A single tensioning cycle comprises a single resting state and a single tensioned state whereby a predetermined clamping force is provided to a cargo.

The transportation body may be embodied as a haulage vehicle, such as a lorry.

The transportation system may comprise a plurality of tensioning systems. At least two of the plurality of tensioning systems may be arranged along a longitudinal direction of the cargo bay.

A method of restraining a cargo is provided. The method comprises arranging a tensioning line within a gap of a spool of a tensioning system. The gap being delimited by surfaces of a first hub, a second hub and a pair of connecting members interconnecting the first hub and the second hub.

The method comprises rotating the spool about a winding axis in a winding direction using a torque generator. The tensioning line being moveable about the gap until the tensioning line is tensioned by the rotation.

The method comprises tensioning the tensioning line by winding the tensioning line around the pair of connecting members within a winding space as the spool rotates. Preferably, the direction of rotation to cause the tensioning is the same. As the spool continues to rotate and the tension in the tensioning line increases a clamping force is applied through the tensioning line to restrain the cargo.

The method further includes holding the spool at a stopping point of rotation by a holding force using a brake. Therefore the object of the brake is to hold the spool in position to prevent rotation of the spool in at least one direction. Furthermore, a length of the winding space in the direction of the winding axis is greater than a length of the gap in the direction of the winding axis.

The step of rotating the spool in the winding direction may be operable within an angular displacement of the tensioning line about a plane perpendicular to the winding axis. That is, the rotation of the spool may not be hindered by movement of the tensioning line away from the plane perpendicular to the winding axis within an angular range.

The angular displacement may be measured as a total angular range about the plane perpendicular to the winding axis. The plane perpendicular to the winding axis may be at the midpoint of the angular range. The angular displacement may be greater than 45 degrees. The angular displacement may be between 60 and 120 degrees. The angular displacement may be between 80 and 100 degrees. The angular displacement may be 90 degrees.

The step of applying the clamping force may continue until a predetermined clamping force is reached. Once the predetermined clamping force is reached a pressure relief valve may be activated to prevent further rotation of the torque generator and to lead to engagement of the brake.

The step of arranging the tensioning line within the gap may comprise pretensioning the tensioning line using elastic properties of the tensioning line. The pretensioning involves putting the tensioning line in a state of tension before use, whereby the term use means the steps of the method including and from rotating the spool. The step of pretensioning the tensioning line comprises abutting the tensioning line against the cargo to be restrained. That is, the tensioning lines exerts a minimal clamping force on the cargo that is negligible to a final clamping force.

The method may further comprise installing the tensioning system into a transportation body, preferably by securing a housing of the brake and a housing of the torque generator to the transportation body. Preferably, one or each housing comprises a flange which is used to secure the tensioning system to the transportation body.

The step of arranging the tensioning line within the gap may comprise fixing the tensioning line to the transportation body. The step of fixing the tensioning line to the transportation body may comprise fixing opposing ends of the tensioning line to the transportation body.

BRIEF DESCRIPTION OF DRAWINGS

For a better understanding of the invention, and to show how example embodiments may be carried into effect, reference will now be made to the accompanying drawings in which.

DESCRIPTION OF EMBODIMENTS

At least some of the following example embodiments provide an improved tensioning system and method of restraining cargo. The example tensioning system is simple and convenient for the user. Many other advantages and improvements will be discussed in more detail herein.

Figure 4:
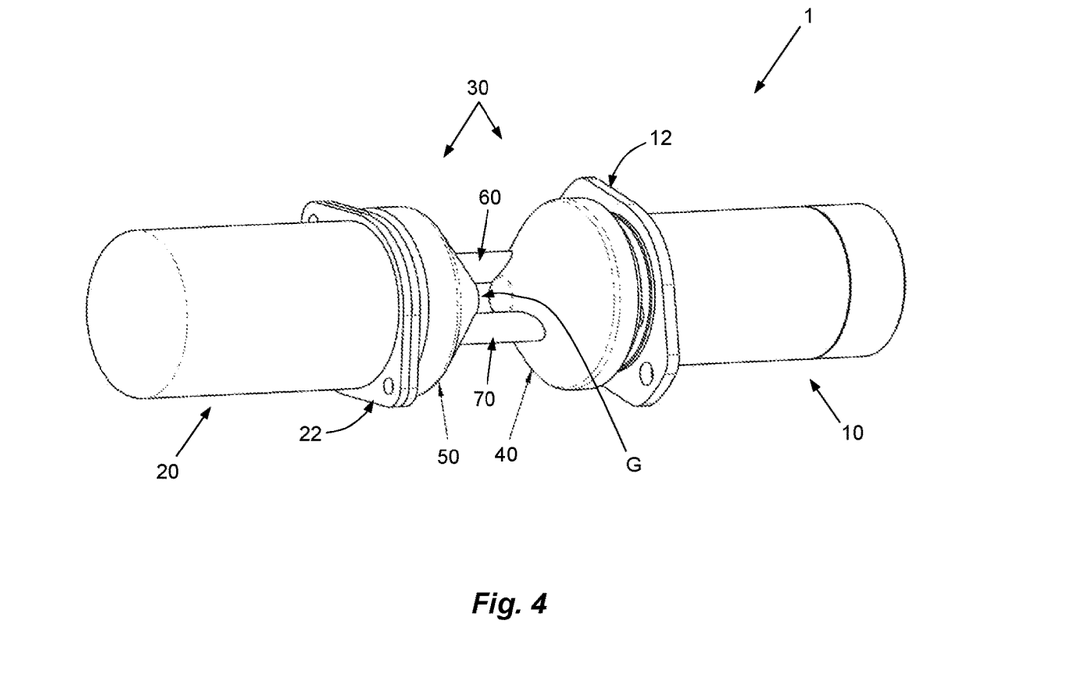
FIG. 4 shows a perspective view of a tensioning system.
Figure 5:
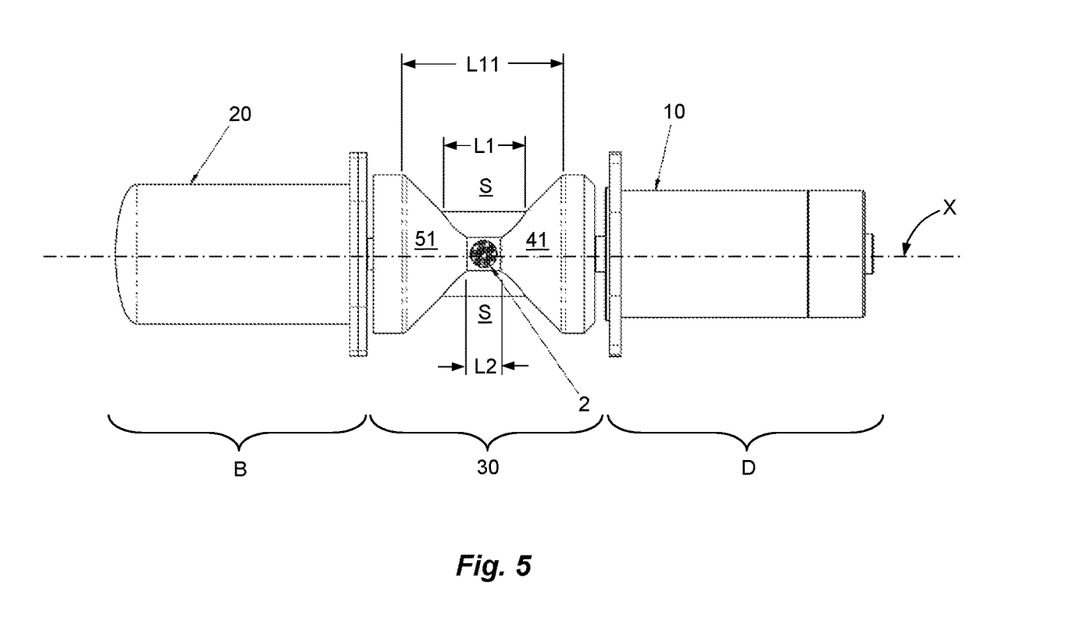
FIG. 5 shows a plan view of the tensioning system of FIG. 4 whereby a tensioning line is present in a spool gap.

A tensioning system 1 is shown in FIGS. 4 and 5. The tensioning system 1 is arranged about a winding axis X around which a spool 30 rotates. This allows the tensioning system 1 to be compact in a radial direction of the winding axis X.

The spool 30 of the tensioning system 1 comprises a pair of connecting members 60,70 (e.g. pins) which are spaced apart from each other to form a gap G there between. The gap G is suitable for receiving a tensioning line 2, for example a rope. The pair of connecting members 60,70 are parallel to each other and the winding axis X. Furthermore, a longitudinal axis of each of the pair of connecting members 60,70 is arranged on the same plane as the winding axis X. As shown, the gap G is large enough to allow the tensioning line 2 to move freely through the gap G when the tensioning line 2 is in a resting state. That is, movement of the tensioning line 2 is unrestricted by either of the pair of connecting members 60,70. The gap G is shown with a square cross-section when looking at the plane through each of the winding axis X and the pair of connecting members 60,70. That is, as the spool 30 rotates the largest cross-sectional shape of the gap G is a square.

The spool 30 further comprises a first hub 40 having a first winding surface 41 and a second hub 50 having a second winding surface 51. The first hub 40 and second hub 50 are interconnected via the pair of connecting members 60,70. The first winding surface 41 and second winding surface 51 are each inclined to the winding axis X. The first hub 40 and second hub 50 are frustoconical in shape whereby a tip of each frustoconical hub 40,50 is arranged closest to the gap G. The tip of each frustoconical hub 40,50 defines a boundary surface of the gap G.

The tensioning system 1 further comprises a torque generator 10 and a brake 20. The torque generator 10 is a means for providing continual rotational torque to the spool 30. The brake 20 is a means for holding a rotational position of the spool 30. The brake 20 may therefore resist rotation of the spool 30 in at least one rotational direction of the spool 30. The brake 20 may be biased towards a holding position and released on demand to permit free wheeling of the rotating parts (i.e. the spool 30). One axial side of the spool 30 is a driving side D and another axial side is a braking side B. The torque generator 10 exists on the driving side D and the brake 20 exists on the braking side B. The torque generator 10 may be a hydraulic motor. The torque generator 10 may be a high speed, high torque motor.

The driving side D is the single axial side responsible for exerting continual rotational torque to the spool 30 and the brake 20 is the single axial side for holding the spool 30 in a rotated portion. The brake 20 is shown to only exist on the braking side B and does not also exist on the driving side D. The torque generator 10 is shown to only exist on the driving side D and does not also exist on the braking side B. Therefore, the braking side B, spool 30 and driving side D exist sequentially in that order. The brake 20 is shown contained within a housing having a flange 22 for securement to a housing of a transportation system. The torque generator 10 is shown contained within a housing having a flange 12 for securement to a housing of a transportation system. As shown, the radial extent of each housing (excluding the flanges) is less than each of the radial extents of the first hub 40 and second hub 50.

As shown in FIG. 5, a winding space S is defined by the first hub 40, second hub 50 and pair of connecting members 60,70. The winding space S is the region in which the tensioning line 2 becomes wound around the spool 30. In the winding axis X direction, the winding space S has a minimum distance L1 greater than the length L2 of the gap G in the same direction. This allows the tensioning line 2 to be arranged side-by-side in the winding space S. This also encourages the tensioning line 2 to be angled with respect to the radial plane of the winding axis X without immediate impingement with one of the first hub 40 or second hub 50. Furthermore, this allows the radius of rotation to be kept minimal to maximise torque. The minimum distance, otherwise called the first length L1 of the winding space S is determined by the length of the each of the pair of connecting members 60,70, which have the same length.

When looking at a radial plane of the winding axis X, the winding space S is arranged as two separate trapezoids. The winding space S has a second length L11, which is a maximum length of the winding space S arranged further away from the gap G than the first length L1. Therefore, the winding space S widens in a radial direction from pair of connecting members 60,70. Advantageously, this allows the tensioning line 2 to spread out over a greater range than the gap G.

Figure 6:
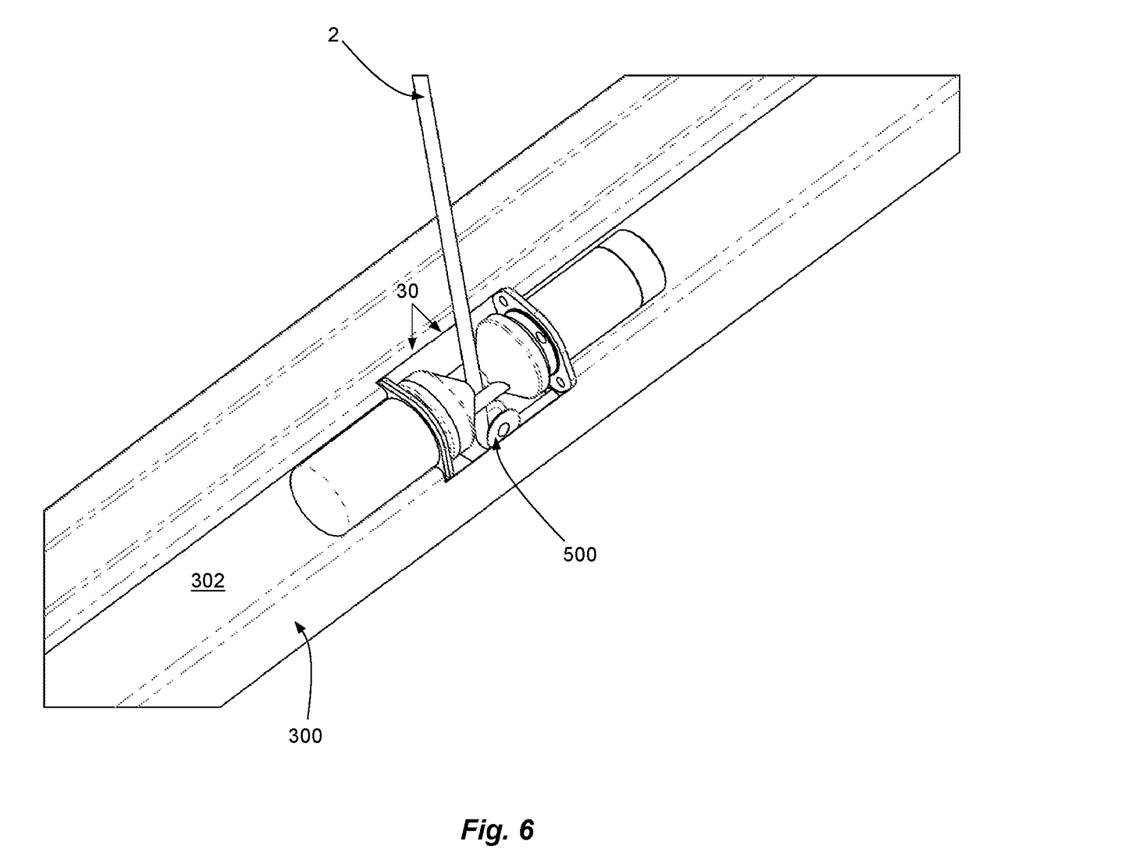
FIG. 6 shows a perspective view of a tensioning system and tensioning line installed in a housing, whereby the tensioning system is in an unloaded position.

FIG. 6 shows the tensioning system 1 shown in FIGS. 4 and 5 arranged in a recess 302 of housing 300 of a transportation system. The tensioning line 2 extends through the gap G and contacts a rotatable pulley wheel 500. The rotatable pulley wheel 500 guides the tensioning line 2 away from the spool 30. The rotatable pulley wheel 500 comprises an axis that is perpendicular to the winding axis X. The tensioning line 2 continues within the recess 302 of the housing 300 and is at least partially concealed by the tensioning system 1. The tensioning line 2 is then fixed to a transportation body by a respective fixing so that the tensioning line 2 cannot be drawn fully through the gap G.

The arrangement shown in FIG. 6 is a resting state (i.e. an unloaded position) whereby the tensioning line 2 may be in pretension by the elasticity of the tensioning line 2. Here, the pair of connecting members 60,70 do not interfere with the tensioning line 2.

Figure 7:
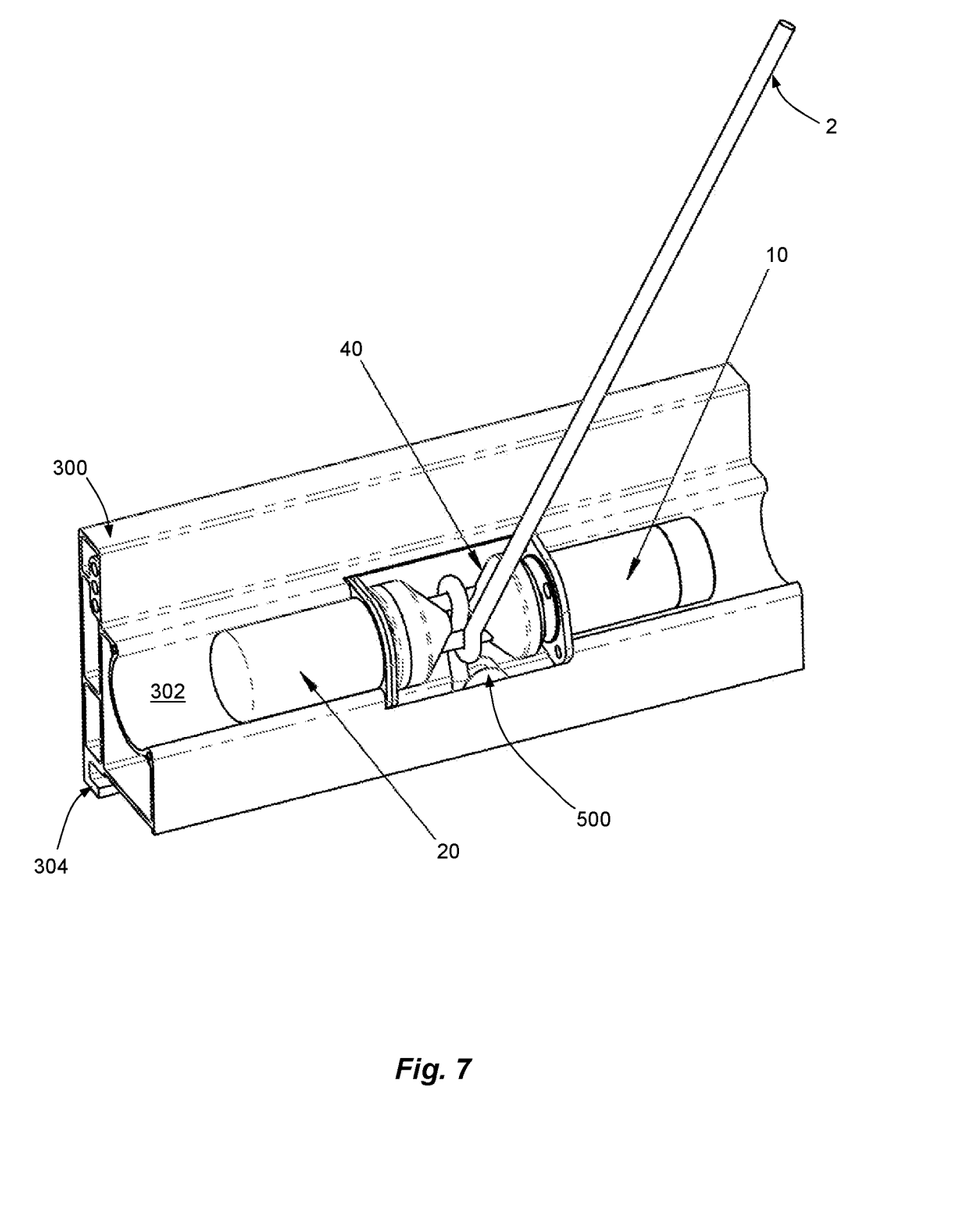
FIG. 7 shows a perspective view of the tensioning system of FIG. 6 whereby the tensioning system is in a loaded position.

FIG. 7 shows the tensioning system 1 in a tensioned state (i.e. a loaded position). The tensioning line 2 has been wound around the pair of connecting members 60,70 of the spool 30 and the tensioning line 2 has been put into a state of tension. The tensioning line 2 is therefore able to exert a clamping force onto cargo arranged in a cargo bay. The spool 30 rotates due to the turning force provided by the torque generator 10 and the brake 20 holds the spool 30 in a rotational position by resisting the tension forces of the tensioning line 2. The torque generator 10 therefore causes the spool 30 to rotate in one rotational direction and the brake 20 resists rotation in the other rotational direction. The brake 20 shown is a one-way clutch such as a sprag clutch.

In FIG. 7 the tensioning line 2 is shown to be angled towards the first hub 40. Therefore, unlike conventional ratchet arrangements, the tensioning line 2 does not need to be carefully maintained within a small (almost negligible) angular range from the plane radial to the winding axis X. The angular range of the current tensioning system 1 is far greater and the first hub 40 and second hub 50 do not impede the tensioning line as much as the conventional approach. The angular freedom allows the tensioning system 1 to remain fixed in position relative to the housing 300 because the tensioning line 2 does not need to be held within the plane radial to the winding axis X as in conventional ratchet systems as previously described.

Figure 8:
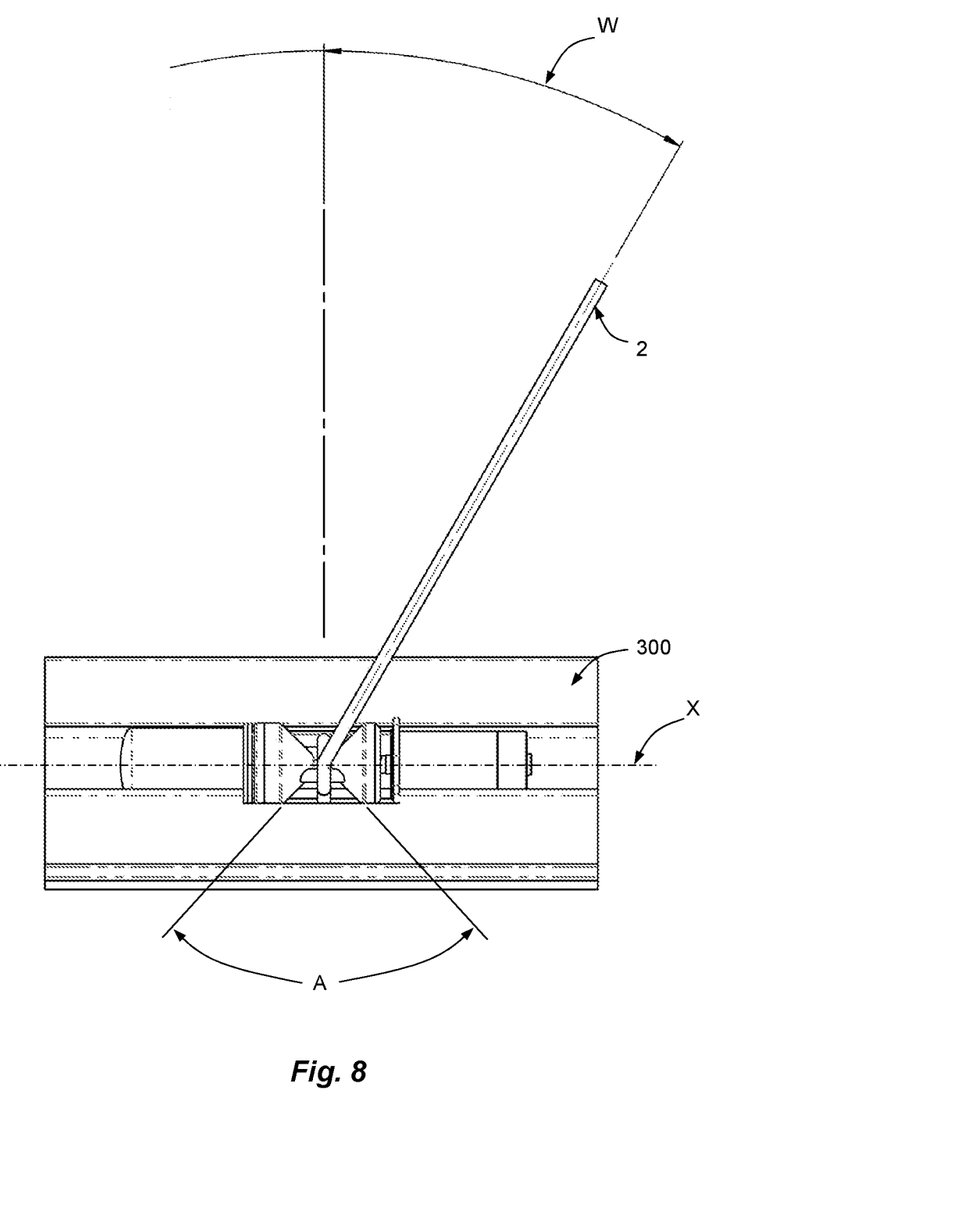
FIG. 8 shows a side view of the tensioning system in the loaded position of FIG. 7.

The greater angular displacement range than a conventional ratchet system is shown more clearly in FIG. 8. The spool 30 is rotatable within an angular displacement of the tensioning line 2 without contact with a winding surface 41,51 about a plane perpendicular to the winding axis X. The angle W is less than half the angle A between the winding surfaces 41,51 of the first and second hubs 40,50. The angle A may be 90 degrees. When the gap G is arranged at a middle of the winding space S in a direction of the winding axis X, room is provided in the winding space away from the centre so that the tensioning line 2 spreads more evenly. Movement of the tensioning system 1 about the housing 300 is not needed for changes in angular displacement of the tensioning line 2, unlike for conventional systems. Therefore, the tensioning system 1 can be fixedly held to a housing 300 of a transportation system.

Figure 9:
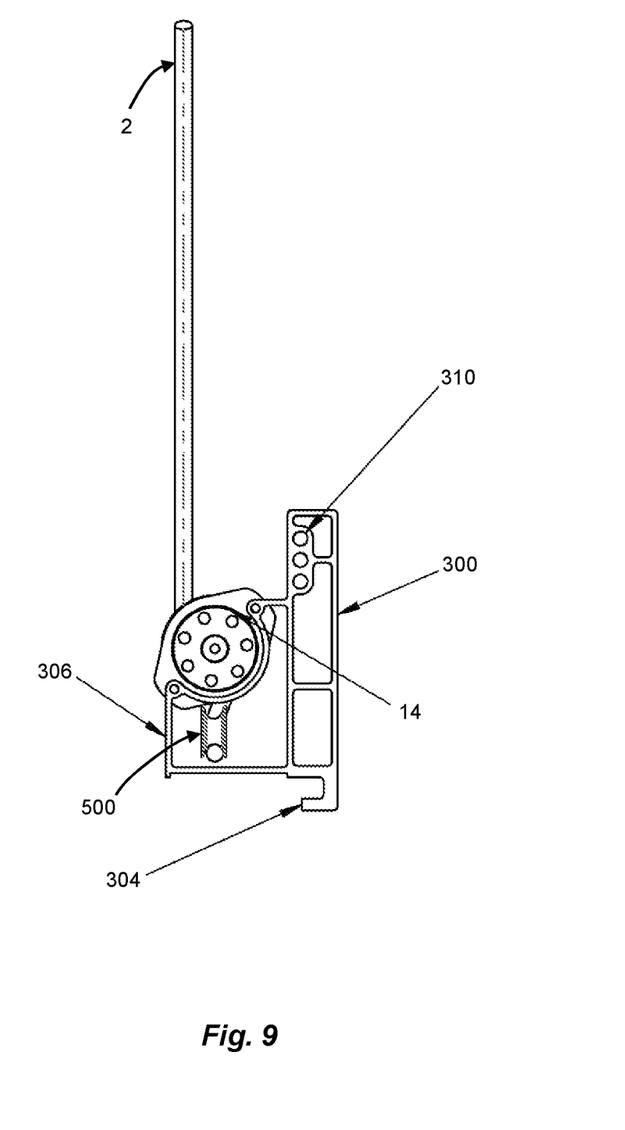
FIG. 9 shows an end view of the tensioning system in the loaded position of FIG. 7.

An end view of the tensioning system 1 in the loaded position is shown in FIG. 9. A cross-sectional view of the housing 300 shows a front face 306 of the housing 300 which may abut a transportation body and/or cargo. The housing 300 comprises a retaining means in the form of a hook 304. The retaining means is for securing the housing 300 to a transportation body. The housing 300 comprises fluid galleries 310 for allowing air, water or oil to be communicated to and from the torque generator 10 and brake 20, wherein the air, water or oil acts as a force transfer medium. The housing 300 may be extruded. The housing 300 may be made from metal such as aluminium. A shape of the recess 302 may correspond to a shape of the housing 14 of the torque generator.

Figure 10:
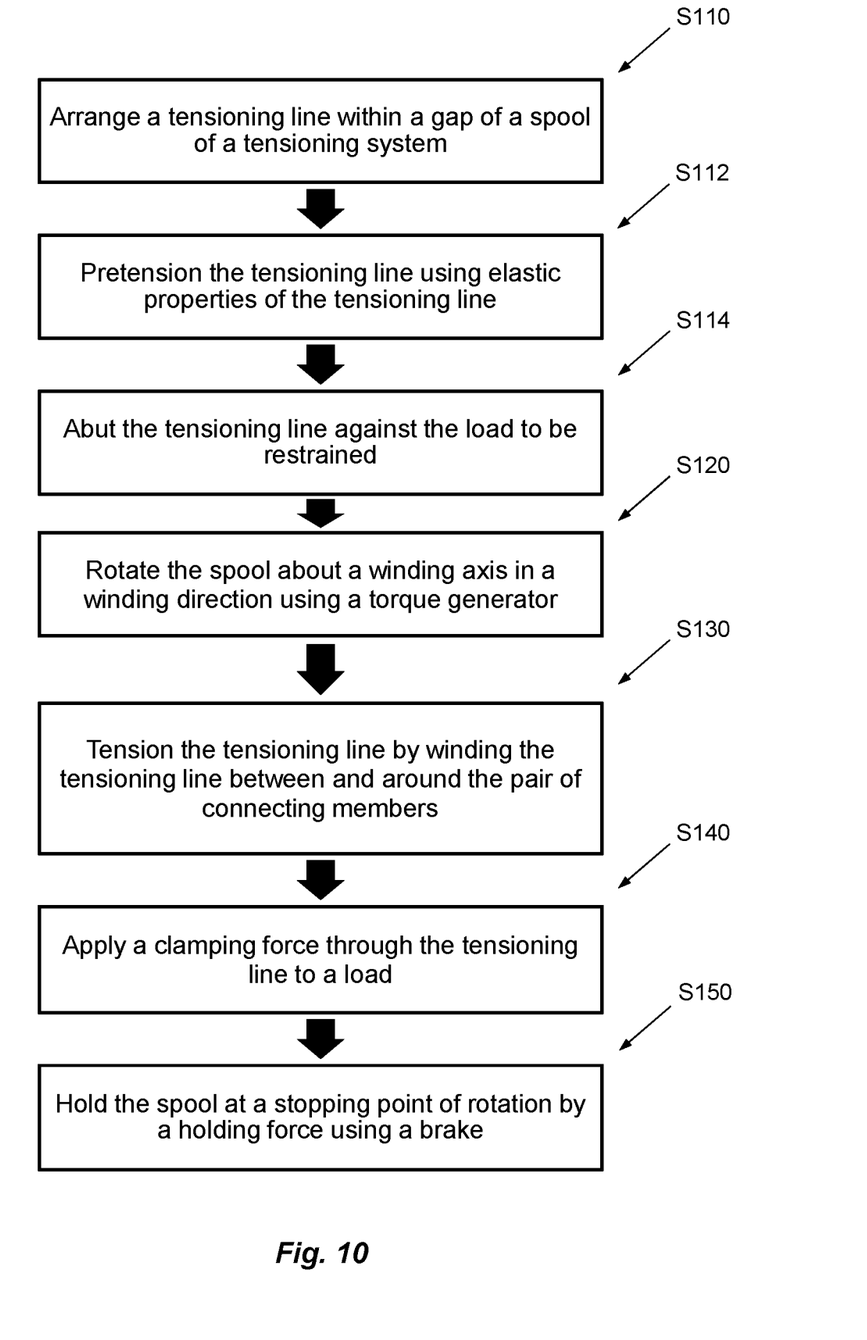
FIG. 10 shows steps of a method of restraining cargo.

A method of using restraining a cargo is shown in FIG. 10. The tensioning system 1 may be operable according to the method. However, a method of the present disclosure may not be limited to the tensioning system 1 as previously described.

The method includes the step of arranging S110 a tensioning line 2 within a gap G of a spool 30 of a tensioning system 1. This means that, at any one time, a portion of the tensioning line 2 exists within the gap G. This does not mean the entire tensioning line 2 is arranged within the gap G. The tensioning line 2 is moveable through the gap G. The gap G is therefore large enough to allow the tensioning line 2 not to be restricted even if contact between a boundary forming the gap G and the tensioning line 2. The gap G is delimited by surfaces of a first hub 40, a second hub 50 and a pair of connecting members 60,70 interconnecting the first hub 40 and the second hub 50.

Optionally, the method includes pretensioning S112 the tensioning line 2 using elastic properties of the tensioning line 2. This avoids any slack in the tensioning line 2. Furthermore, the method may include abutting S114 the tensioning line 2 and cargo to be restrained. Such contact is therefore made before a rotational force from the torque generator is passed via the spool 30 to the tensioning line 2.

The method includes rotating S120 the spool 30 about a winding axis X in a winding direction using a torque generator 10 and tensioning S130 the tensioning line 2 by winding the tensioning line 2 around the pair of connecting members 60,70 within a winding space S as the spool 30 rotates. Friction between the tensioning line 2 and the pair of connecting members 60,70 help to maintain the tensile force applied.

Furthermore, the method comprises applying S140 a clamping force through the tensioning line 2 to restrain the cargo and holding S150 the spool 30 at a stopping point of rotation by a holding force using a brake 20.

Advantageously, the tensile load can be applied at a range of angles in addition to the angle perpendicular to the axis of rotation of the tensioning system 1.

Unlike the conventional ratchet and strap mechanism 100, which requires the application of a series of short arcs of rotation, the rotational force applied to the spool 30 in the current tensioning system 1 is continuous and consistent. The torque generator 10 rotates through 360 degrees until a pre-set load had been applied. High forces can be applied rapidly. Operator decides when load has been sufficiently applied, whereas in the present tensioning system 1, this is determined by a controller for varying torque transfer between the torque generator 10 and said tensioning line 2. The slack in the tensioning line 2 is removed automatically in the present system by the elasticity of at least one portion of the tensioning line 2. A plurality of tensioning systems 1 can be operated simultaneously. For example, a push button may be used to remove the labour intensive aspect of operating each tensioning system 1.

Although the embodiments are most applicable to road vehicles due to the high dynamic forces associated with road vehicles, the tensioning system can also apply to other industrial applications, such as railway wagons.

In summary, exemplary embodiments of a tensioning system have been described. Additionally, the described exemplary embodiments are convenient to operate and provide for repetitive and reliable cargo restraint.

Although preferred embodiment(s) of the present invention have been shown and described, it will be appreciated by those skilled in the art that changes may be made without departing from the scope of the invention as defined in the claims.

The invention claimed is:

1. A tensioning system (1) comprising:
a spool (30) rotatable about a winding axis (X);
a torque generator (10) for transmitting torque to the spool; and
a brake (20) for imparting rotational resistance to the spool;
wherein the spool comprises:
  a first hub (40);
  a second hub (50); and
  a pair of connecting members (60,70) interconnecting the first hub and the second hub and configured for transmitting torque between the first hub and the second hub;
wherein the pair of connecting members are spaced apart to form a gap (G) for receiving a tensioning line (2) to be tensioned by the spool, wherein the gap is delimited by surfaces of the first hub, the second hub and the pair of connecting members; and
wherein the spool comprises a winding space (S) for receiving said tensioning line when wound around the pair of connecting members (60,70), wherein a length (L1,L11) of the winding space in a direction of the winding axis is greater than a length (L2) of the gap in the direction of the winding axis; and
wherein a winding surface (41) of the first hub (40) and a winding surface (51) of the second hub (50) are inclined with respect to the winding axis (X) at an angle less than 90 degrees.

2. The tensioning system (1) according to claim 1, wherein the gap (G) is located midway along the length (L1,L11) of the winding space.

3. The tensioning system (1) according to claim 1, wherein the winding space (S) comprises a first length (L1) and a second length (L11), wherein the first length (L1) is closer in distance to the winding axis and smaller in value than the second length (L11).

4. The tensioning system (1) according to claim 1, wherein the first hub (40) and the second hub (50) are frustoconical.

5. The tensioning system (1) according to claim 4, wherein an angle (A) within each plane radial to the winding axis (X) between a winding surface (41) of the frustoconical first hub (40) and a winding surface (51) of the frustoconical second hub (50) is between 50 degrees and 130 degrees.

6. The tensioning system (1) according to claim 5, wherein the angle (A) is between 85 degrees and 95 degrees.

7. The tensioning system (1) according to claim 1, wherein each of the pair of connecting members (60,70) have a cross-sectional shape that is rotationally symmetric when viewed in the direction of the winding axis (X); and
each of the pair of connecting members (60,70) have a cylindrical cross-sectional shape.

8. The tensioning system (1) according to claim 1, wherein an output speed of the torque generator decreases from a first winding speed to a lower second winding speed when winding said tensioning line (2) around the pair of connecting members (60,70).

9. The tensioning system (1) according to claim 1, wherein the brake (20) is arranged to prevent rotation of the second hub (50) in a rotational direction that is opposite to a driving rotational direction; and
the brake (20) is biased to a rotation prevention state.

10. The tensioning system (1) according to claim 1, comprising a controller for varying torque transfer between the torque generator (10) and said tensioning line (2) to be tensioned.

11. A transportation system comprising:
a transportation body moveable by a propulsion means and having a cargo bay for carrying a cargo;
the tensioning system (1) of claim 1;
a housing (300) for coupling the tensioning system to the cargo bay; and a tensioning line (2) for being tensioned by the tensioning system (1).

12. The transportation system according to claim 11, wherein the tensioning line (2) comprises a first portion and a second portion, wherein the second portion is more elastic than the first portion.

13. The transportation system according to claim 11, wherein each end of the same tensioning line (2) is fixed to the transportation body by a respective fixing such that movement of the tensioning line (2) through the gap (G) is prevented by each fixing, the transportation system further comprising:
   a freely rotatable pulley wheel (500) for guiding the tensioning line (2) away from the spool (30); and
   a net in communication with the tensioning line (2) for conforming to the shape of said cargo and for distributing a clamping force imparted on said cargo.

14. A method of restraining a cargo comprising the steps of operating the tensioning system of claim 1, the method including the steps of:
   arranging (S110) the tensioning line (2) within the gap (G) of the spool (30) of the tensioning system (1),
   rotating (S120) the spool about a winding axis (X) in a winding direction using a torque generator (10);
   tensioning (S130) the tensioning line by winding the tensioning line around the pair of connecting members within a winding space (S) as the spool rotates;
   applying (S140) a clamping force through the tensioning line to restrain the cargo; and
   holding (S150) the spool at a stopping point of rotation by a holding force using the brake (20).

15. The method according to claim 14, wherein:
   the step of rotating (S120) the spool (30) in the winding direction is operable within an angular displacement of the tensioning line (2) about a plane perpendicular to the winding axis (X);
   the step of applying (S140) the clamping force continues until a predetermined clamping force is reached;
   the step of arranging (S110) the tensioning line (2) within the gap (G) comprises pretensioning (S112) the tensioning line using elastic properties of the tensioning line; and
   the step of pretensioning (S112) the tensioning line (2) comprises abutting (S114) the tensioning line against the cargo to be restrained.

* * * * *